July 11, 1944.    D. SAMIRAN    2,353,191
AUTOMATIC SHUTOFF VALVE
Filed Aug. 6, 1941    2 Sheets-Sheet 2
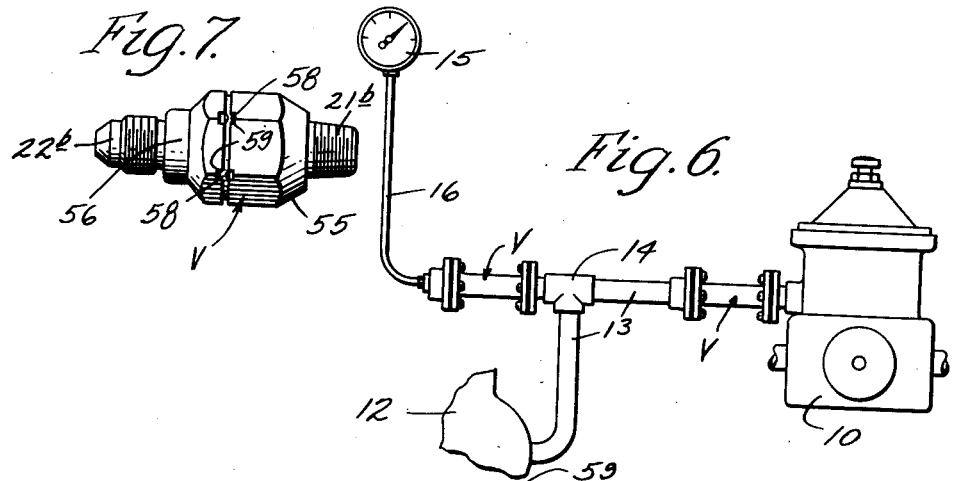
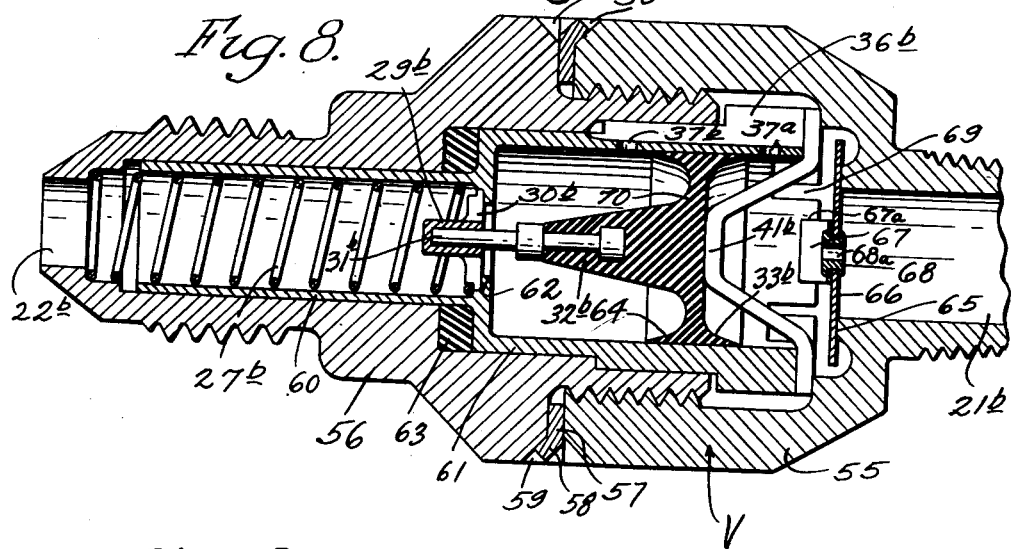
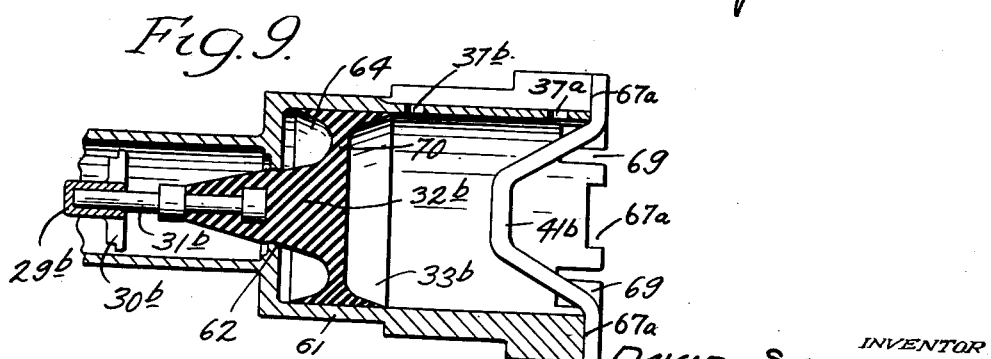

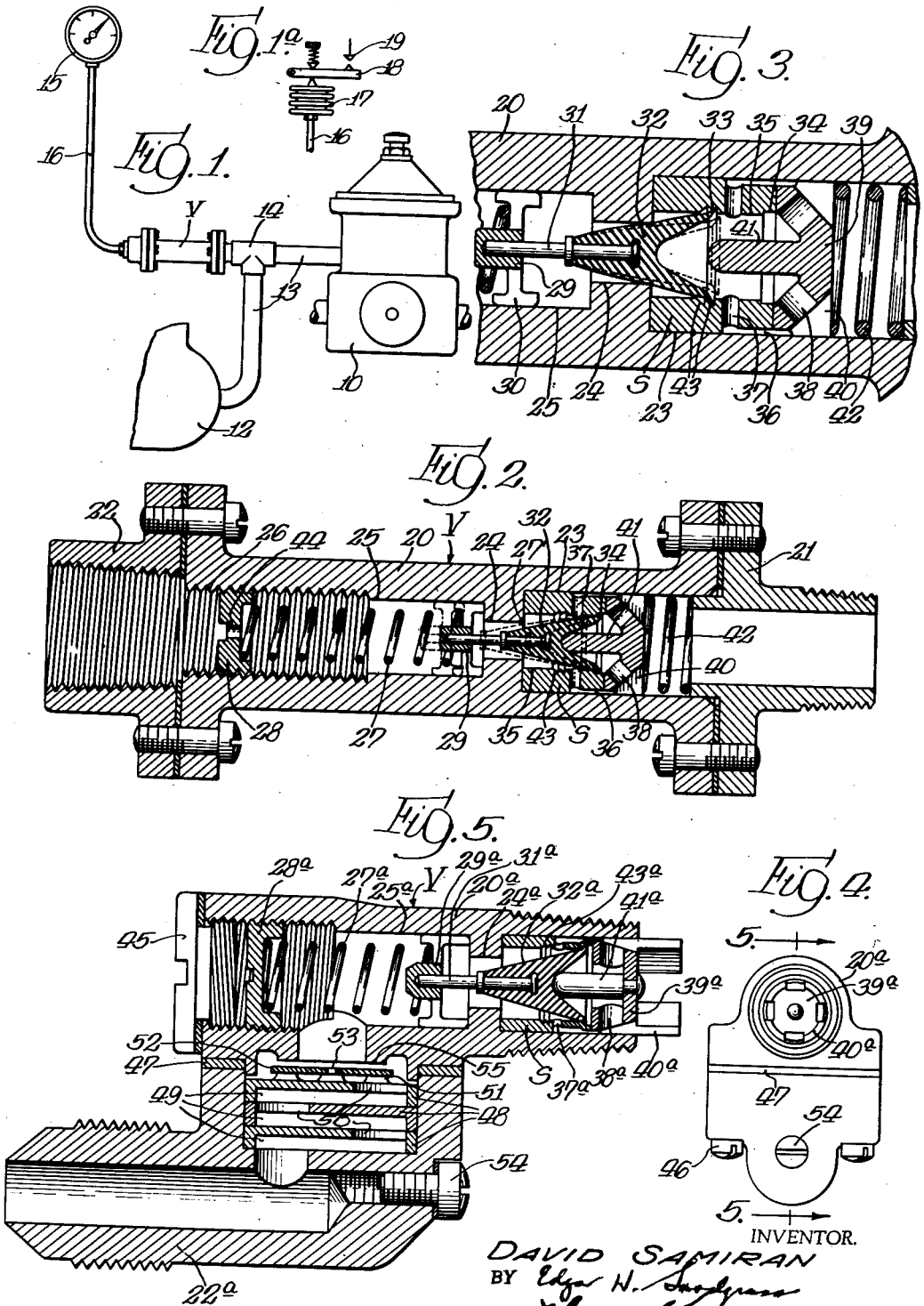

Patented July 11, 1944

2,353,191

UNITED STATES PATENT OFFICE 2,353,191

AUTOMATIC SHUTOFF VALVE

David Samiran, Fairfield, Ohio

Application August 6, 1941, Serial No. 405,675

12 Claims. (Cl. 137—153)

(Granted under the act of March 3, 1883, as amended April 30, 1928; 370 O. G. 757)

The invention described herein may be manufactured and used by or for Government or governmental purposes, without the payment to me of any royalty thereon.

My present invention relates to an automatic shut-off valve which will shut off the flow of fluid to an indicating device, a pressure control device or a pressure operated device, or the like, when the fluid containing system on the outlet side of the valve is ruptured at any point.

One object of the invention is to provide a shut-off valve of the general character mentioned which is entirely automatic in operation in that it permits normal fluid flow and normal surges in the fluid line, but when a rupture takes place, thereby causing excess fluid flow, the valve closes against leakage of the fluid under pressure at the rupture.

My automatic shut-off valve is particularly useful in connection with aircraft engines, where the rupture of a fuel line presents a fire hazard. For instance, pressure indicating devices or pressure operated devices may be located in the cockpit of the plane and oil or fuel lines may extend thereto from the oil pump, fuel pump, carburetor or other part of the engine, for the purpose of indicating pressure of such part or for operating an automatic control dependent upon changes in such pressure.

It is therefore a further object of my invention to provide an automatic shut-off valve structure which may be interposed between such an indicating or control device and the part of the engine supplying fluid pressure thereto, so that upon failure of the indicating or control device or any part of the fluid line leading thereto, the fuel or other fluid being supplied through the shut-off valve to the indicating or control device will be shut off at the valve, thus eliminating the possibility of spraying the liquid into the cockpit of the engine compartment or on any part of the plane where it might catch fire.

Still a further object is to provide an automatic shut-off valve structure wherein the valve is normally open as long as normal fluid flow or pressure surges in the fluid system occur, but upon excess fluid flow, as would happen in the case of a rupture, the valve will automatically respond to the increased fluid flow and shut off in such manner that it must be reset before it can be put into operation again.

Still a further object is to provide a modified form of my invention wherein a shut-off element of the valve is so shaped and arranged as to maintain a balance on the opposite sides of the shut-off element during normal fluid flow, the shut-off element moving automatically to its shut-off position upon an unbalanced condition occurring as a result of line rupture or the like.

Another object is to provide a modified form of simplified construction having a two-part body in which various inserts are assembled and the two parts then screwed together, means being provided to lock them in assembled position.

Another object is to provide a shut-off element in the valve structure so constructed and arranged as to permit resetting thereof by the introduction of fluid pressure to the outlet side of the shut-off valve, after which the valve may be connected for further service.

Still another object is to provide a baffle plate arrangement in the valve body to take care of fuel pressure gauge systems and the like wherein a liquid fill other than the fuel is used to charge the liquid system between the shut-off valve and the indicating or control device, a check valve being associated therewith for preventing the liquid fill from entering the shut-off valve when the fill is of greater specific gravity than the fuel and the valve is in inverted position, a restricted opening being provided through the check valve to permit pressure equalization on opposite sides thereof in the event that the fill expands under high temperature conditions.

Still another object is to provide a plug in the valve body to permit introduction of the liquid fill at the time of installation of the valve.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of my shut-off valve showing it connected in a fuel system including a fuel pump, a carburetor and a fuel gauge;

Figure 1ª illustrates diagrammatically a pressure control or pressure operated device which can be used instead of the pressure gauge of Figure 1, and with which my shut-off valve will operate equally as well;

Figure 2 is an enlarged sectional view through the shut-off valve per se, showing it by solid lines in normal position and by dotted lines in a position intermediate normal and shut-off positions;

Figure 3 is a further enlarged sectional view of a portion of Figure 2 showing the valve in shut-off position, and by dotted lines the shape that the shut-off element assumes as a result of reverse fluid pressure flow through the valve for resetting purposes;

Figure 4 is an end elevation of another form of my shut-off valve;

Figure 5 is an enlarged sectional view on the line 5—5 of Figure 4;

Figure 6 is a side elevation of two of my shut-off valves showing them connected in a fuel system so as to guard against fuel leakage either by a rupture in the line to the carburetor or by a rupture in the line to a fuel gauge;

Figure 7 is a full-size side view of a modified form of the invention;

Figure 8 is an enlarged longitudinal sectional view of the form of my shut-off valve shown in Figure 7 showing the parts in normal operating position; and Figure 9 is a similar sectional view of a portion of Figure 8 showing the shut-off element in its shut-off position.

On the accompanying drawings, I have shown my automatic shut-off valve connected in Figure 1 with a fuel pump 10 and a carburetor 12. A fuel line 13 extends from the outlet of the pump 10 to the inlet of the carburetor 12. A pipe T 14 is inserted in the line at 14. A fuel pressure gauge 15 is illustrated, having a conduit 16 leading thereto. Ordinarily, the conduit 16 is connected with the T 14 so that the pressure of fuel from the pump to the carburetor may be indicated. My shut-off valve is indicated generally at V and, it will be noted, is interposed between the T 14 and the conduit 16 for the purpose of shutting off the flow of fuel from the pump 10 through any rupture in the conduit 16 or the gauge 15, as will be hereinafter described.

In Figure 1ª, I show the conduit 16 connected with a control device or pressure operated bellows 17 instead of the pressure gauge 15, as my shut-off valve is adapted for devices of this character as well as for any device receiving liquid under pressure where there is the desirability of shutting off the liquid if a rupture occurs. The bellows 16, by way of illustration, is shown as operating a control in the form of a switch arm 18 for closing a circuit through a contact 19.

My shut-off valve V, as shown in Figures 2 and 3, comprises a central body portion 20 having end flanges 21 and 22 for connection with the T 14 and the conduit 16, respectively. Through the body 20 a bore, having portions 23, 24, 25 and 26, extends. The portion 23 receives a sleeve S, while the portion 24 is a restriction to provide a valve seat at 27'. The portion 26 is threaded to receive an adjusting nut 28 for a spring 27. The spring 27 is interposed between the nut 28 and a socket member 29 having a plurality of spokes 30 forming a guide for movement of the socket element 29 in the bore 25.

Received in the socket element 29 is a valve stem 31. A cone-shaped shut-off element 32 is molded on the stem 31, the element 32 being made of rubber, DuPrene, or the like.

The shut-off element 32 has an outwardly flared flange 33 at its periphery or open end adapted to normally enter an enlargement 34 of a bore 35 of the sleeve S, as shown by solid lines in Figure 2. When the enlarged portion 34, liquid entering the flange fitting 21 passes through a space 36 around the sleeve S and through by-pass ports 37, thereby by-passing the enlarged bore portion 34 wherein the outwardly flared flange 33 is seated. This flange is seated under pressure by the fluid entering the interior of the cone-shaped shut-off element 32 through openings 38 formed in a disc element 39. The element 39 has spokes 40 to support it in the bore portion 23 and a pinlike extension 41 to serve as a stop for the cone-shaped element 32 by engaging the inner surface thereof in the normal position of the shut-off element, as shown by solid lines in Figure 2. The disc element 39 is retained in position by a spring 42 interposed between the spokes 40 and the flange fitting 21.

The bore 35 of the sleeve S is also provided with a pair of ratchetlike teeth 43 adapted at times to receive the flared flange 33, as will be hereinafter described. The fluid that by-passes through the ports 37 flows through the valve seat 27, between the spokes 30 and through an opening 44 in the adjusting nut 28.

In Figures 4 and 5, I have shown a modified construction wherein access may be had to an adjusting nut 28ª by removing a plug 45. The valve body 20ª is somewhat modified so as to have an outlet fitting 22ª secured thereto as by screws 46, with a gasket 47 interposed between the body and the fitting. The fitting 22ª has therein a plurality of baffle plates 48 providing baffle spaces at 49. The baffle plates have staggered openings 50 and the upper plate is provided with projections 51 to support a check valve disc 52. The disc 52 has a small opening 53 therethrough for equalization of the pressure, as will be hereinafter described. A filler plug 54 is provided for use in charging the fluid system from the fitting 22ª through the conduit 16 to the gauge or control device 15 or 17, with a suitable fluid such as Prestone, or the like, which is immiscible with relation to a fluid such as fuel.

The parts of the valve shown in Figure 5 which are not thus far described are similar to those already described in connection with Figures 2 and 3, and bear the same reference numerals with the addition of the character a.

In the modification shown in Figures 7, 8 and 9, a two-part body is provided, one part bearing reference numeral 55 and the other part 56. The part 55 has an inlet opening 21ᵇ and the part 56 has an outlet opening 22ᵇ. The part 56 is screwed into the part 55 with a lock washer 57 between them. The lock washer is initially flat, and after assembly may be bent at points indicated as 58 into notches 59 of the body parts 55 and 56 to thereby lock the body parts against subsequent unscrewing relative to each other.

Within the valve V, illustrated in Figure 8, there are a number of inserts, some of which are similar to or, at least, have parts similar to those already described in connection with Figure 2. Such parts bear the same reference numerals, with the addition of b. Other parts and portions thereof which are different will now be described.

A tubular insert is provided having a small cylindrical portion 60 and an enlarged cylindrical portion 61. These portions are connected together by a constricted part terminating in a valve seat 62. The shut-off element 32ᵇ is adapted to seat against the seat 62 at times, as shown in Figure 9. The insert 60—61 is sealed within the body of the valve by a gasket 63.

The shut-off element 32ᵇ, besides having the cone-shaped part 33ᵇ, has a second cone-shaped part 64. The parts 33ᵇ and 64 are normally located between the by-pass ports 37ª and 37ᵇ and against the stop member 41ᵇ which, in this case, is in the form of a bar bent to a V-shape and retained in position by resting the ends in two of the four equally spaced slots 67ᵃ which are cut across the right-hand end of the cylinder 61 (see Fig. 9). The body portion 55 engages the ends of the stop bar 41ᵇ to retain it in assembled position.

The valve shown in Figure 8 also has a valve seat at 65 with which a disk valve 66 engages. A long, slightly arched spring leaf 67 is secured to the disk 66 by a tubular rivet 68 which forms a restricted or capillary orifice 68ᵃ, the outer ends of the spring resting in the other two of the slots 67ᵃ. Four deeper slots 69 are cut intermediate the four shallow slots 67ᵃ in the ends of the cylinder 61.

Practical operation

Normally, the parts of my shut-off valve assume the solid line position shown in Figure 2. In this position, the spaces at 36 and the by-pass ports 37 are of sufficient capacity to permit the necessary flow of fluid to the bellows 17 or to the pressure gauge 15, as the case may be, and to take care of any possible surges in the fluid system beyond the valve V without operating the valve to shut-off position. Obviously, the bellows 17 would require by-pass passageways of greater area than would a Bourdon type of gauge, which takes but an infinitely small flow of fluid for its operation. In the event of the failure of the gauge or control device, or rupture of the conduit 16, then the fluid under pressure entering the flange fitting 21 would tend to flow out through such rupture. The passageways 37 are of sufficiently small area to offer considerable resistance to such flow, with the result that pressure is built up through the openings 38 and inside the cone-shaped shut-off element 32 to propel it toward closed position with respect to the valve seat 27'. For instance, the dotted position of Figure 2 illustrates the shut-off element being so propelled, with the flared flange 32 disengaged from the bore enlargement 34 by the pressure of the flowing fluid inside the cone-shaped element, and effecting a contraction of the flared flange 33 so that it may travel inside the bore 35. Normally, the shut-off element will seat against the seat 27', as shown by solid lines in Figure 3, and the flared flange 33 will expand into one of the ratchet-like teeth or annular grooves 43. Just before entering the teeth, the flared flange will have passed the ports 37 to close them off and permit the full force of the fluid under pressure entering the flange fitting 21 to effect the final closing of the shut-off element against the valve seat with snap action, and at the same time insuring expansion of the flared flange 33 into the groove 43.

The shut-off valve is now in its shut-off position, so that the fluid under pressure can no longer flow through the valve V and be discharged through the rupture which caused the valve to operate. Thus, the possibility of fuel, for instance, being discharged into the cockpit of an airplane or into the engine compartment, which represents a fire hazard, is eliminated in the event that the conduit 16 is ruptured through any cause, such as by a penetration of a bullet.

The shut-off valve is now in such position that it cannot be used again without resetting. Resetting is accomplished by disconnecting the conduit 16 and introducing fluid under pressure, such as compressed air, to the fitting 22. This causes reverse flow through the valve, which will effect contraction of the cone-shaped shut-off element as to the dotted position of Figure 3, and both the compressed air and the spring 27 will then cause the shut-off element to move to its initial position, shown by solid lines in Figure 2.

The spring 27 is set so that the shut-off element 32 will move to its shut-off position at any pressure desired, which of course corresponds to an excessive fluid flow through the valve as caused by a rupture. The valve may even be used on fluid consuming devices by enlarging the passageways 37 and increasing the tension of the spring 27 so that as long as the fluid flow is not in excess of the capacity of the fluid consuming device, the shut-off valve will not operate, but when a rupture occurs between the valve and the fluid consuming device the increased flow of fluid operates the valve.

With the form of invention shown in Figures 4, and 5, it is possible to hook up a gauge or the like with fitting 22ᵃ, remove the screw 54 and charge the gauge 15, the conduit 16 and the fitting 22ᵃ, including the baffle spaces 49, with a suitable fluid, such as Prestone or the like. The screw 54 may then be reinserted with assurance that the Prestone, serving as a fill, will not pass into the valve body 20ᵃ, first because of the restricted spaces 49 between the baffle plates 48, coupled with the tortuous path for the fill provided by the staggered openings 50 of the baffle plates, and second because the check valve 52 would normally seat against a seat indicated at 55. When fuel pressure enters the valve body 20ᵃ, it will open the check valve 52 to permit ready transmission of its pressure through the fill in the fitting 22ᵃ to the gauge 15, but prevent ready reverse flow. To take care of expansion caused by heat ambient to the gauge 15 and/or the conduit 16, the small opening 53 is provided to relieve any such pressure back into the fitting 20ᵃ. The check valve 52 serves as a means to prevent gravity flow of the Prestone fill into the valve body 20ᵃ when the valve is in inverted position, as the fill will not readily flow through the small opening 53 except when pressure, such as caused by expansion from heat, is applied to the fill.

My automatic shut-off valve, it will be obvious from the foregoing specification, is automatic in that it shuts off the flow of a fluid under pressure through a rupture in the fluid containing system. Where the fluid under pressure is an inflammable material, the fire hazard is eliminated. The valve is also useful for the purpose of conserving valuable fluids being pumped from one point to another, where there is danger of rupture in the fluid line.

By way of example, in Figure 6 I show two of the valves V instead of one, as in Figure 1. The second valve is mounted between the fuel pump 10 and the carburetor 12 so that if there is a rupture in the line 13 the valve adjacent the pump 10 will shut off. This valve, of course, would have its by-pass ports 37 of the proper size to permit maximum fuel flow to the carburetor 12, but shut off whenever there is excessive flow as caused by rupture in the line to the carburetor.

My shut-off valve is also adaptable for use in connection with acids or other chemicals being pumped from one point to another which might cause damage if discharged from a ruptured line.

In the operation of the modified form of my invention illustrated in Figures 7, 8 and 9, the portions 33ᵇ and 64 of the shut-off element 32ᵇ form opposed pressure faces between which a pressure balance is normally maintained. Fuel at the normal rate flows from the inlet 21ᵇ through the restricted opening 68ᵃ but does not open the valve disk 66 in so doing. The fuel then flows through the slots 69 of the cylinder 61, enters the passageways 36ᵇ, by way of port 37ᵃ and then flows through the by-pass ports 37ᵇ, the valve seat 62 and the cylinder 60, to the outlet 22ᵇ. The fuel pressure is balanced on opposite sides of a partition wall 70 of the shut-off element 32ᵇ so that the spring 27ᵇ keeps the shut-off element against the stop bar 41ᵇ. Excessive fuel flow, however, reduces the pressure within the cone-shaped part 64 of the shut-off element, which, of course, is possible due to the restricted character of the by-pass ports 37ᵇ. Predominating pressure in the inlet 21ᵇ therefore enters into play to move the valve 66 off its seat and permit greater flow through the four slots 69 and against the surface 33ᵇ than may readily pass through the openings 37ᵃ, and thus moves the shut-off element 32ᵇ toward the left against the bias of the spring 27ᵇ. The first action that occurs is cut off of the fuel at the ports 37ᵇ by the cone-shaped part 64, whereupon the full flow pressure acting in the cone-shaped part 33ᵇ snaps the shut-off element to the closed position of Figure 9. In this position the shut-off element wedges into the valve seat 62, as illustrated, and I have found that this wedging action is sufficient in certain installations without the necessity of utilizing the ratchet teeth 43 of Figure 2.

One of the principal advantages of the form of construction shown in Figure 8 over that shown in Figure 2 is that by locating the valve member 66 as in Figure 8, excessive drainage from the valve is prevented when the airplane engine, and consequently the fuel pump, are not operating. With the parts as shown in Figure 2, there is a tendency, when the airplane engine and fuel pump are not operating, for fluid to drain from the valve into the pipe 21 and air to flow into the space vacated by the fluid. Upon again starting the engines, if a substantial quantity of air has passed into the space to the left of the valve and this air is compressed by fluid pressure from the right, the effect is the same as if the line to the left of the valve were open, resulting in an unwanted movement of the valve which may amount to a closing movement. Placing valve 66 to the right of the valve assembly as shown in Figure 8 avoids any possibility of such a condition of operation arising. With the parts as in Figure 8, when the engines and the fuel pump cease to operate, any tendency of fluid to flow from the valve assembly is prevented by a consequent closing of valve 66—the orifice 68ᵃ in member 68, like a small opening in a bottle, preventing the movement of any substantial amount of liquid therethrough. Owing to the fact that the amount of air which passed through the orifice 68ᵃ in member 68 is negligible, the valve will function normally when the engines and fuel pump again operate. The arrangement of parts as shown in Figure 8 also has a damping effect on the indicator gauge, since any surging tendency in the line will be accompanied by a closing of valve 66 when the movement of fluid is toward the right.

To reset the shut-off valve of Figure 8 for subsequent automatic operation the valve is disconnected, as already described in connection with Figure 2, and compressed air introduced through it in a reverse direction.

The valve 66 prevents drainage of fluid from the shut-off valve V and eliminates the possibility of an undesired movement of the valve to closing position, as might be the case if air were trapped in the valve when it was put back into service. The valve 66 closes when compressed air is introduced in a reverse direction through the valve and prevents the fuel or other fluid in the valve from draining out.

The valve in operation automatically closes in such manner that it is locked in the closed position and can be reset only by a specific operation, such as introducing compressed air of sufficient pressure in a reverse direction through the valve to contract the shut-off element 32 and move it to its initial position.

Some changes may be made in the construction and arrangement of the parts of my device without departing from the real spirit and purpose of my invention, and it is my intention therefore to cover by my appended claims any modified forms of structure or use of mechanical equivalents which may be reasonably included within their scope without sacrificing any of the advantages thereof.

I claim as my invention:

1. In an automatic shut-off valve of the character disclosed, a valve body having a bore therethrough, opposite ends of said bore constituting an inlet and an outlet for the valve, a substantially cone-shaped shut-off element in said bore provided with an open base end, said bore having a valve seat, means normally spacing said shut-off element from said seat with said open end of the element facing said inlet, said bore having an enlarged portion to receive the periphery of said shut-off element and to normally retain said shut-off element against closing on said seat, said periphery engaging said enlarged portion to prevent flow past the periphery, by-pass ports to permit normal fluid flow past said periphery of said shut-off element, said shut-off element being incapable of resisting excess fluid flow whereby such excess fluid flow moves said shut-off element to seat against said valve seat, means to retain said shut-off element in position against said valve seat upon its assumption of such position, said last means comprising a groove in said bore on the outlet side of said ports adapted to receive the periphery of said shut-off element, said periphery of said shut-off element being contractible from its position in said groove and the shut-off element being returnable to normal position by introduction of fluid pressure to the outlet side of said valve for resetting purposes, and a baffle plate arrangement in said valve body on the outlet side of said valve seat.

2. In a valve structure of the character disclosed, a valve body, a baffle plate arrangement in said valve body on the outlet side thereof, a removable plug in said valve body on the outlet side of said baffle plate arrangement to permit the introduction of a liquid fill into the valve body on the outlet side thereof, and a check valve between said baffle plate arrangement and the interior of said valve body, opening away from said interior and having a restricted orifice for liquid pressure equalization through said check valve.

3. An automatic shut-off valve comprising a valve body having a bore for the flow of fluid under pressure therethrough, a valve seat in said bore, a shut-off element in said bore and having its periphery engaging the bore to prevent flow between said periphery and said bore, said valve body having ports adjacent the periphery of and by-passing said shut-off element to permit balancing of fluid pressure on opposite sides thereof and to permit normal flow of fluid through the valve body by way of said ports, means biasing said shut-off element to its normal position, said ports permitting flow of fluid through said valve during normal operation thereof and introducing resistance to such flow of fluid when excessive through said shut-off valve to thereby cause the fluid under pressure entering said valve body to predominate on one side of said shut-off element and move it until its periphery moves past said ports and thereby shuts off the flow of fluid through said valve, said shut-off element thereupon being subjected to the full fluid pressure to move quickly to its closed position, said valve body having a normally seated check valve at its inlet side and opening from the inlet toward the interior of the body, said check valve having a capillary opening therethrough.

4. An automatic shut-off valve comprising a valve body having a bore for the flow of fluid under pressure therethrough, a valve seat in said bore, a tapered shut-off element in said bore having oppositely opening cone-shaped parts and having its periphery engaging the wall of said bore to normally prevent flow thru said bore around said periphery, said valve body having ports by-passing said parts to permit balancing of fluid pressure on opposite sides of said shut-off element, said by-pass ports being located between the inlet to said bore and said valve body, means biasing said shut-off element to its normal position, said ports permitting flow of fluid through said valve during normal operation thereof and introducing resistance to such flow of fluid when it becomes excessive through said shut-off valve to thereby cause the fluid under pressure entering said valve body to predominate on one side of said shut-off element and move it until its periphery passes said ports and thereby shuts off the flow of fluid through said valve, said shut-off element thereupon being subjected to the full fluid pressure to move quickly to its seated position with respect to said valve seat and being compressible by the introduction of fluid pressure in a reverse direction through said bore to unwedge the shut-off element from said valve seat and permit movement thereof to its initial position.

5. In an automatic shut-off valve structure, a valve body having a bore therethrough, a valve seat in said bore, a shut-off element, resilient means urging said shut-off element to non-shut-off position with respect to said valve seat said shut-off element being constructed and arranged that when so positioned it prevents fluid flow between itself and the bore, by-pass ports around said shut-off element and located between the inlet of the bore and said valve seat to permit normal fluid flow, said ports resisting excess fluid flow through said valve, said shut-off element thereupon being seated with relation to said valve seat by the flow of such excess fluid, and a normally seated check valve opening inwardly and located at the inlet end of said valve body, said check valve having an opening therethrough large enough to permit only normal fluid flow.

6. An automatic shut-off valve for a flow line leading to a pressure operated device or the like, which is arranged to close when excess flow occurs between its inlet and its outlet resulting from failure of said flow line or pressure operated device or the like, comprising a valve body having a bore therethrough, one end of said bore constituting an inlet for said fluid under pressure and the other end thereof constituting an outlet, a valve seat in said bore facing the inlet end thereof, a hollow substantially cone-shaped shut-off element in said bore having a portion for co-action with said seat and having its base presenting an open end facing said inlet, the open end of said shut-off element having an outwardly flared flange, said bore having an enlarged part in which said flared flange of said shut-off element is normally positioned, said flared flange coacting with the wall of said enlarged part of said bore to close off the flow of fluid through said bore past the periphery of said shut-off element, spring means biasing said shut-off element to such normal position in which said portion that coacts with the seat is spaced from said seat, ports by-passing said shut-off element to permit a normal flow of fluid through said valve, said ports being of small capacity to introduce substantial resistance to the flow of fluid upon an abnormal drop in the pressure on the outlet side of said shut-off valve and thereby cause the fluid under pressure entering said valve body to move said shut-off element until its flared flange passes said ports and coacts with said enlarged part of said bore to thereby shut off the flow of fluid through said valve by way of said by-pass ports when the portion which coacts with said seat is seated, and ratchetlike teeth receiving said flared flange of said shut-off element and thereby preventing return movement of said shut-off element to its normal position by the bias of said spring, said shut-off element being compressible by the introduction of fluid under pressure to said outlet end of said bore to retract said flared flange from said ratchetlike teeth and permit movement of said shut-off element to its normal position for resetting purposes.

7. An automatic shut-off valve for a flow line leading to a pressure operated device or the like which is arranged to close when excess flow occurs between its inlet and its outlet resulting from failure of said flow line or pressure operated device or the like, comprising a valve body having a bore therethrough, one end of said bore constituting an inlet for fluid under pressure and the other end thereof constituting an outlet, a valve seat in said bore facing the inlet end thereof, a substantially cone-shaped resilient shut-off element in said bore having a portion for co-action with said seat and having its base end open and facing said inlet, said open end having an outwardly flared flange, said bore having an enlarged part in which said flared flange is normally positioned, said flared flange coacting with the wall of said enlarged part of said bore to close off the flow of fluid through said bore past the periphery of said shut-off element, the coacting portion being spaced from the valve seat when the shut-off element is in its normal position, means by-passing said shut-off element to permit a normal flow of fluid through said valve, said by-pass means being of small capacity to introduce substantial resistance to the flow of fluid upon an abnormal drop in the pressure on the outlet side of said shut-off valve and thereby cause the fluid under pressure entering said valve body to move said shut-off element until its flared flange passes said by-pass means and coacts with said enlarged part of said bore to shut off flow through said valve by way of said by-pass means when said coacting portion seats on said seat, and means to retain said shut-off element in shut-off position upon assumption of such position.

8. An automatic shut-off valve for a flow line leading to a pressure operated device or the like which is arranged to close when excess flow occurs between its inlet and its outlet resulting from failure of said flow line or pressure operated device or the like, comprising a valve body having a bore for flow of fluid under pressure therethrough, a valve seat in said bore, a substantially cone-shaped shut-off element in said bore having a portion for coaction with said seat and having its base open and facing the source of fluid under pressure, said bore having an enlarged part in which the periphery of said shut-off element is normally positioned, said periphery of said shut-off element coacting with the wall of said enlarged part of said bore to close off the flow of fluid through said bore past the periphery of said shut-off element, means biasing said shut-off element to such normal position in which said portion that coacts with the seat is spaced from said seat, ports by-passing said shut-off element to permit a normal flow of fluid through said valve, said ports introducing substantial resistance to the flow of fluid upon an abnormal drop in the pressure on the outlet side of said shut-off valve and thereby causing the fluid under pressure entering said valve body to move said shut-off element until its periphery passes said ports and coacts with said enlarged part of said bore and thereby subjects said shut-off element to the full fluid pressure to positively shut off the flow of fluid to said valve by way of said by-pass means when said coacting portion seats on said seat.

9. An automatic shut-off valve comprising a valve body having a bore therethrough provided with a valve seat, a cone-shaped resilient element having its periphery engaging the wall of said bore, means to normally position said cone-shaped resilient element to unseat it from said seat, said resilient element being so constructed and arranged that when so positioned its periphery engages the walls of said bore and prevents flow through said bore around its periphery, by-pass ports around said cone-shaped element in its normal position and located between the inlet to said bore and said valve seat, said ports being of restricted capacity to introduce substantial resistance to the flow of fluid when excessive flow through the valve occurs, said fluid pressure thereupon moving said cone-shaped element to seated position with respect to said valve seat and effecting a wedging of said cone-shaped element in said valve seat due to the resiliency of the element to thereby lock it against return movement to normal position.

10. In an automatic shut-off valve, a valve body having a bore provided with a valve seat, a shut-off element having its periphery engaging the wall of said bore and normally spaced from said seat but shutting off the flow to said bore around the periphery to said element, said valve seat being between said shut-off element and the outlet of the valve, by-pass ports around said shut-off element in its normal position and located between the inlet and said valve seat, said ports being of a capacity which introduces substantial resistance to the flow of fluid when excessive flow through the valve occurs, said fluid pressure in said inlet side thereupon moving said shut-off element to a seating position on said valve seat for shutting off the flow of fluid through said by-pass ports, said fluid pressure acting fully upon said shut-off element during the final closing thereof to seat it with snap action after said by-pass ports are closed by the shut-off element moving from its normal position.

11. An automatic shut-off valve structure comprising a valve body having an inlet and an outlet, a bore connecting said inlet and outlet, a valve seat in said bore, a cone-shaped shut-off element having its periphery engaging the wall of said bore to prevent flow through said bore around the periphery of said element, a stop pin for said element, resilient means urging said element to a normal position engaging said stop pin and spaced from said seat, said bore having an enlarged portion receiving the periphery of said shut-off element in such position, by-pass ports around said periphery of said shut-off element, and located between the inlet to said bore and said valve seat to permit normal fluid flow, said ports resisting excess fluid flow when occurring thru said valve and thereby causing the fluid pressure to propel the cone-shaped shut-off element to seated position with relation to said valve seat, said bore having an annular groove between said ports and said valve seat to receive the periphery of said shut-off element and thereby retain it against return movement to its normal position, said shut-off element being distortable by the introduction of fluid pressure from the outlet side of said valve to remove its periphery from said annular groove and to effect such return, baffle means in said valve body between said seat and said outlet, and a check valve between said baffle means and said valve seat.

12. In an automatic shut-off valve structure, a valve body having a bore therethrough, a valve seat in said bore, a shut-off element having its periphery engaging the wall of said bore and normally preventing flow through said bore around said periphery, resilient means urging said element to non shut-off initial position with respect to said seat, by-pass ports around said shut-off element and located between the inlet to said bore and said valve seat to permit normal fluid flow, said ports resisting excess fluid flow when occurring through said valve, said element thereupon being seated with relation to said valve seat by the flow of such excess fluid, said bore having an annular groove between said ports and said valve seat to receive the periphery of said shut-off element and thereby retain it against return movement to its initial position, said shut-off element being distortable by the introduction of fluid pressure from the outlet side of said valve to contract said periphery thereof from engagement in said annular groove to thereby effect such return of said shut-off element to initial position for resetting purposes.

DAVID SAMIRAN.